Figure 1:
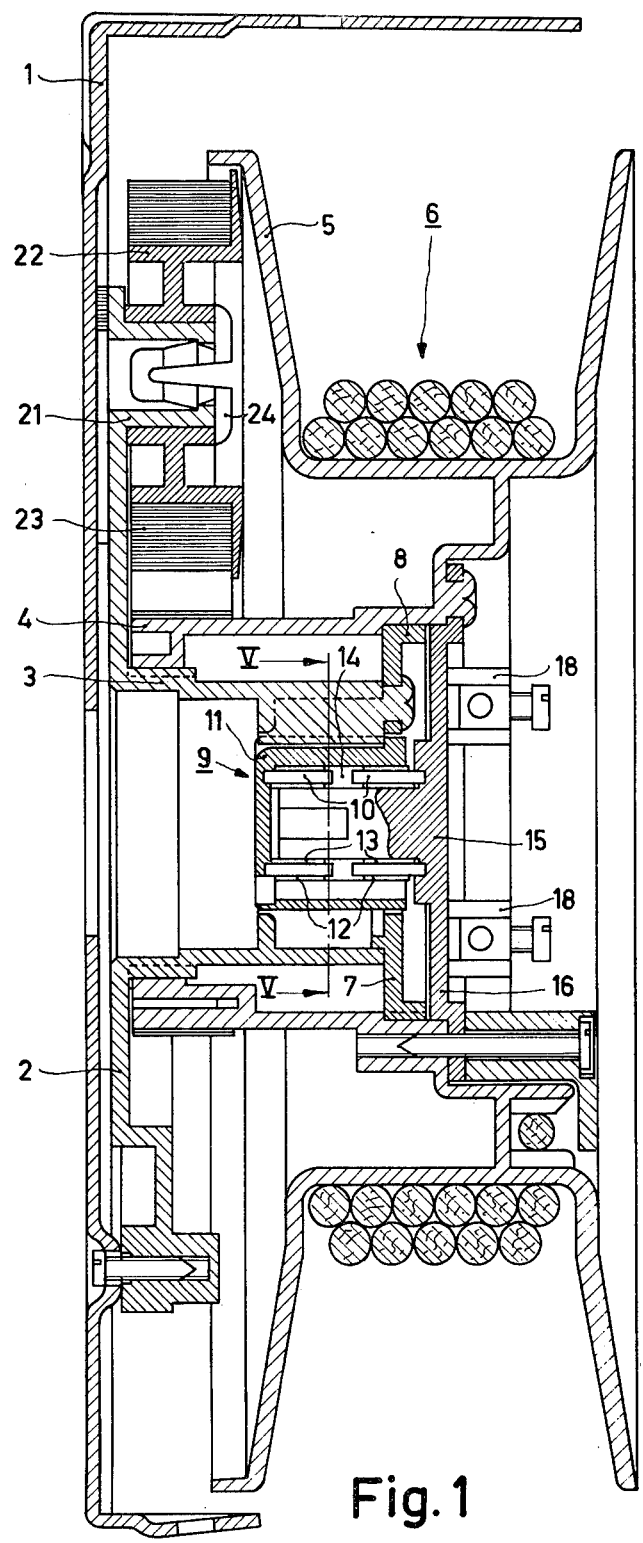

United States Patent [19]

Deurloo

[11] 4,133,416

[45] Jan. 9, 1979

[54] ELECTRIC CORD WINDER

[75] Inventor: Johannis M. Deurloo, Emmen, Netherlands

[73] Assignee: Draka Kabel B.V., Amsterdam, Netherlands

[21] Appl. No.: 773,614

[22] Filed: Mar. 2, 1977

[30] Foreign Application Priority Data

Mar. 12, 1976 [NL] Netherlands .......................... 7602589

[51] Int. Cl.² ............................................. H02G 11/02
[52] U.S. Cl. ................................ 191/12.2 R; 339/5 RL
[58] Field of Search ............... 15/323; 137/355.26; 191/12.2 R, 12.4; 242/107 R; 254/152; 339/5 RL, 6 RL, 8 RL

[56] References Cited

U.S. PATENT DOCUMENTS

| | | | |
|---|---|---|---|
| 3,011,033 | 11/1961 | Belicka et al. | 191/12.2 R |
| 3,137,883 | 6/1964 | Descarries | 191/12.2 R X |
| 3,167,161 | 1/1965 | Appleton | 191/12.2 R |
| 3,590,171 | 6/1971 | Harrington | 191/12.2 R |

Primary Examiner—Stephen G. Kunin
Attorney, Agent, or Firm—Rolf E. Schneider; Frank R. Trifari

[57] ABSTRACT

An electrical cord winder comprises a mechanical section and an electrical section. The mechanical section includes a rotatable cord drum rotatably journalled on a hollow journal secured at one end to a frame, the drum being axially retained between the frame and a plate secured to the other, free end of the hollow journal. A spring is tensioned between the drum and the frame for automatically winding the cord. The electrical section includes rotary electrical couplings which can be fitted into the hollow journal from the free end thereof.

1 Claim, 5 Drawing Figures

ELECTRIC CORD WINDER

This invention relates to a cord reel having a rotatable drum for an electric cord, which drum is rotatably journalled on a hollow journal of a frame, a spring being tensioned between the drum and the frame for automatically winding the cord and electrical contact elements being provided between the rotatable drum and the frame.

Generally, all the mechanical and electrical parts of known electric cord reels or winders of this type must be assembled completely before the cord reel can be checked for correct operation. In the event of defects in the drum or the spring, the electrical parts frequently have to be disassembled.

It is an object of the invention to provide a solution for this and the invention is characterized in that at one end the journal is secured to an anchor plate of the frame, whilst on the other, free end a plate is mounted which retains the drum in an axial direction, and in which the contact elements can be mounted on the journal from the free end of the journal. The mechanical and the electrical sections can be manufactured and assembled separately. The mechanical section comprising the drum mounted on the journal and the spring can be checked separately, for example for rotation and spring action. The electrical section can also be checked separately both in respect of its mechanical operation and the electrical operation of the contact elements. Subsequently, these sections may be assembled, the electrical section being mounted on the hollow journal from one side. It is even possible to stock the mechanical and the electrical sections separately. The electrical section may for example be manufactured and stocked in a 2-pole or in a 3-pole version. The mechanical section may then optionally be assembled to a 2-pole or a 3-pole electrical section. This is of importance because this enables a higher production rate to be obtained.

A preferred embodiment is characterized in that the contact elements are mounted in the hollow journal. By accommodating the contact elements in the hollow journal the cord reel can be rendered compact. The contact elements are constituted by rotary electrical couplings.

A further preferred embodiment in which the contact elements are roller bearings, is characterized in that the roller bearings are enclosed in a housing, which housing is disposed in the hollow journal. As a result of this, it is not necessary for the drum and the anchor plate to comply with stringent electrical requirements such as non-conductivity. Only the housing, which is a constructionally much smaller component than the drum or the anchor plate, is of a material whose electrical properties meet strict requirements, whilst for this component properties such as strength and sliding quality need not comply with strict requirements because the contact elements are not mechanically loaded. Still a further embodiment is characterized in that on the anchor plate at some distance from the journal a second hollow journal is mounted, on which a spring drum including a spring is rotatably journalled, which spring drum is axially retained between the anchor plate and a retaining cap which is mounted on the second hollow journal. The retaining cap snaps behind a rim in the hollow journal by means of hooks, so that rapid assembly is possible. The spring is S-shaped, in such a way that one end is wound on the spring drum and the other end on the drum hub in the opposite direction.

Figure 2:
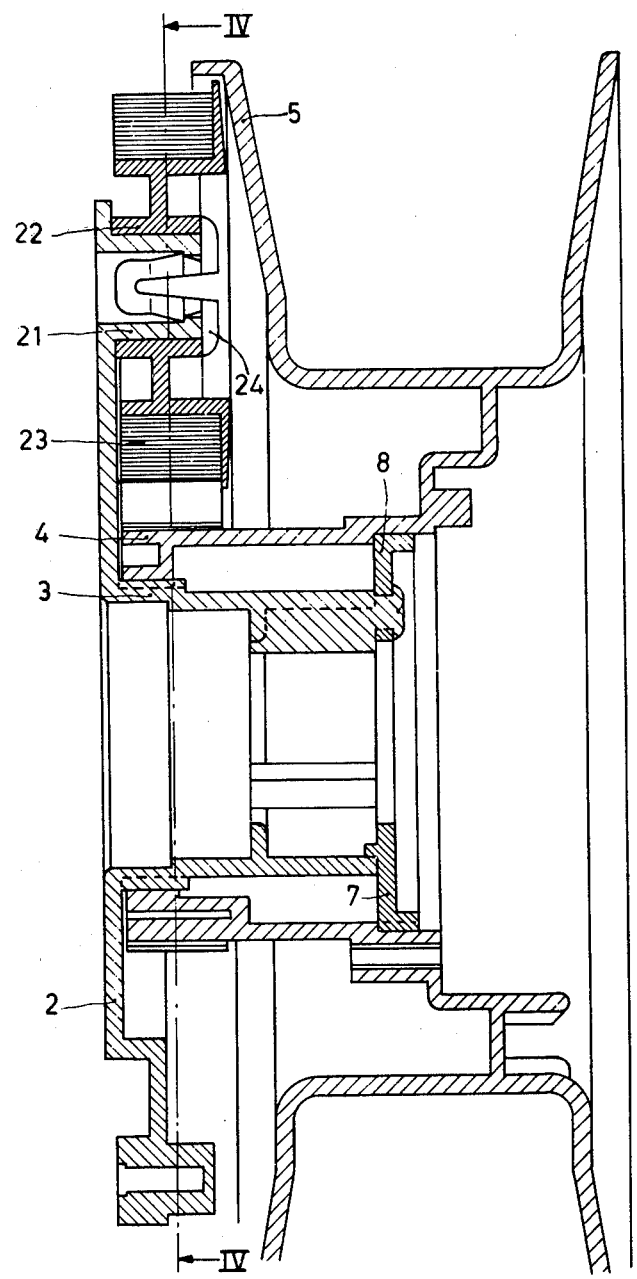
Figure 3:
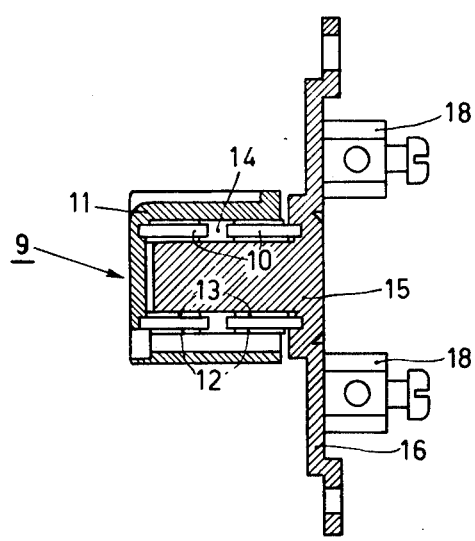
Figure 4:
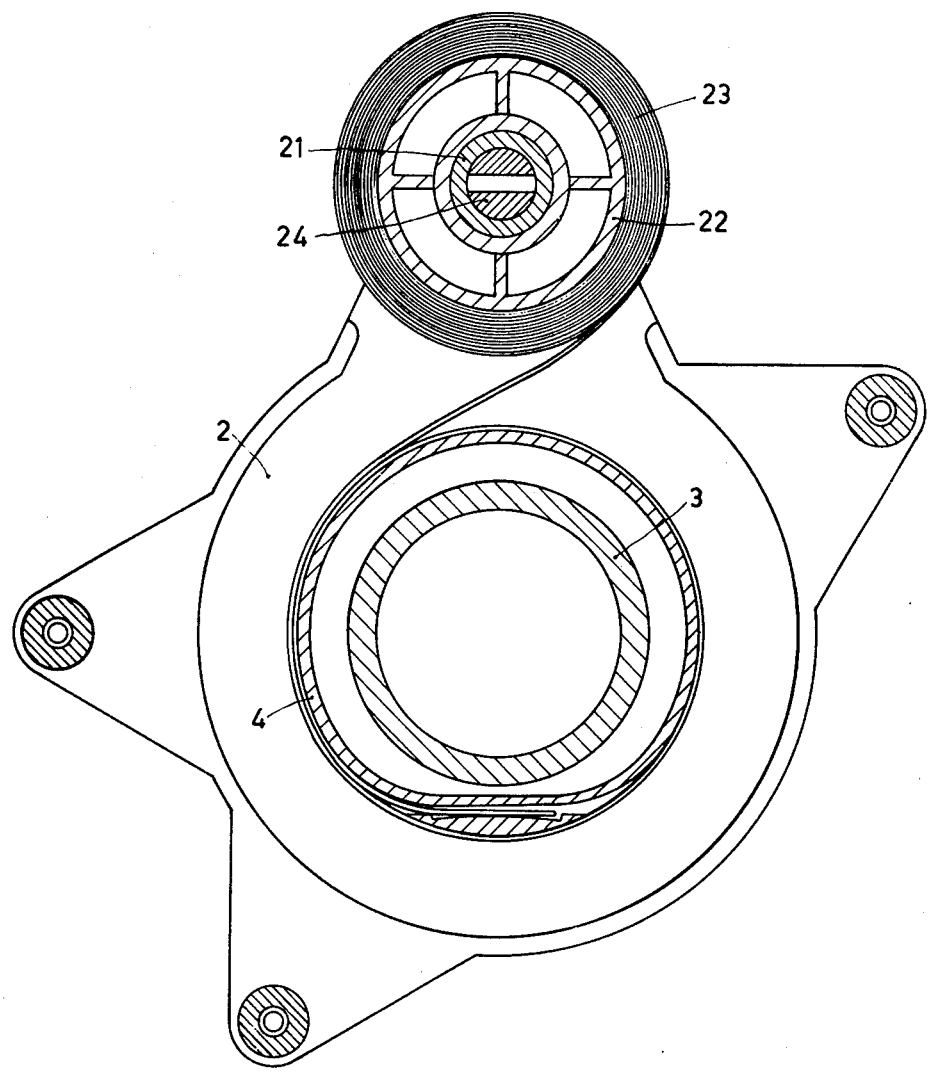
Figure 5:
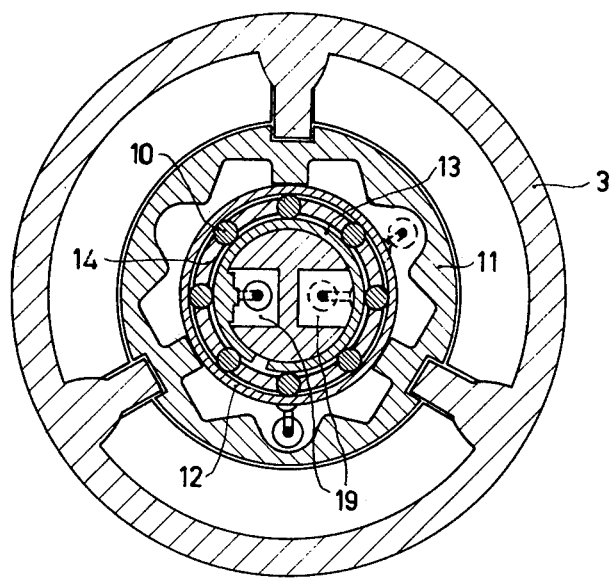

The invention will be described in more detail with reference to the embodiments shown in the drawings, in which FIG. 1 is a cross-section of the cord reel, FIG. 2 is a cross-section of the mechanical section of the cord reel, FIG. 3 is a cross-section of the electrical section of the cord reel, FIG. 4 is a cross-section on a slightly reduced scale taken along line IV—IV in FIG. 2, FIG. 5 is a cross-section of the roller bearing taken along line V—V in FIG. 1 on an enlarged scale.

The cord reel has a frame which for example comprises a bracket 1 to which an anchor plate 2 is secured with the aid of known fixing means. In its center the anchor plate 2 is formed with a hollow journal 3 on which the hub 4 of the drum 5 is rotatably journalled. An electric connecting cord 6 can be wound onto the drum. To the outer end of the hollow journal 3 a bearing plate 7 is secured. The bearing plate 7 has a flange 8 on which the hub 4 of the drum 5 can rotate. Thus, the drum is journalled at two points.

The anchor plate 2 is also provided with a second hollow journal 21 which is disposed off the center of the plate, over which journal 21 a spring drum 22 can rotate, which drum contains a winding spring 23 for automatically winding the cord 6. The spring drum 22 is retained between the anchor plate 2 and a retaining cap 24. The retaining cap 24 snaps behind a rim of the hollow journal 21 by means of hooks. This enables rapid assembly. The winding spring 23 is S-shaped, in such a way that one end of the spring is wound onto the spring drum 22, whilst the other end is wound onto the hub 4 of the drum 5 in the opposite direction. This type of winding spring provides a constant torque irrespective of the length of cord that has been pulled out. Moreover, such spring may comprise a great many turns, so that a great cord length is possible, whilst maintaining a compact construction. The cross-section of the spring may be curved, which even further increases the torque. Now this mechanical section can first be inspected completely (see FIG. 2).

The electrical section is constructed as follows. The hollow journal 3 accommodates two sets of roller bearings 9, which serve as rotary electrical couplings. The rollers 10 of each roller bearing 9 are accommodated in a non-rotatable housing 11 of an electrically insulating material. The rollers 10 rotate between the two rings 12, 13 of the respective roller bearings. These rings are of an electrically conductive material. The outer ring 12 is stationary. The inner ring 13 is not fully closed and presses the rollers against the outer ring with a small force. The rollers 10 themselves are also of an electrically conductive material, for example copper. The rollers are not mechanically loaded. The rollers 10 of the two roller bearings 9 are separated from each other by a ring 14 of an insulating material. The inner ring 13 is mounted on an inner core 15 also of an insulating material. This inner core has a flange 16 for fixation to the hub 4 of the drum 5. On the flange 16, electrical contacts 18 are provided for connection to the cord 6. Each contact 18 is furthermore electrically connected to one of the inner rings 13. For this purpose openings 19 for the wiring (see FIG. 5) are formed in the inner core 15. Each outer ring can be connected electrically to the contacts of for example a motor or a connector.

By the use of two roller bearings 9 a two-pole connection can be obtained. For a multi-pole connection an equivalent number of roller bearings is needed. The contacts 18 on the flange 16 are accessible from the outside, so that the cord 6 can readily be replaced without the necessity to disassemble the components of the cord reel. This electrical section can also be checked completely in advance (see FIG. 3).

Assembling the mechanical and the electrical sections to form a cord reel can now be effected simply by sliding the electrical section with the housing 11 into the hollow journal 3 of the mechanical section and by securing the flange 16 to the edge of the hub 4 of the drum 5. The housing 11 then cannot rotate in the hollow journal 3.

The cord reel may furthermore be equipped with a braking device which for example acts on the drum flange or on the load.

The cord reel is suitable for incorporation into various appliances such as vacuum cleaners, fan heaters etc.

What is claimed is:

1. An electrical cord winder, which comprises a frame, a hollow journal mounted at one end on said frame, a drum for winding the electric cord, said drum being rotatably journalled on the hollow journal, a spring tensioned between the drum and the frame for automatically winding the cord on the drum, a plate, means for mounting the plate on the other end of the hollow journal to retain the drum in its axial direction, and electrical contact elements provided for connection to the cord, said contact elements comprising at least two roller bearings enclosed in a housing non-rotatably disposed in the hollow journal and mounted in the hollow journal from the other end of said journal.

* * * * *